United States Patent [19]

Bueno

[11] Patent Number: 4,530,467
[45] Date of Patent: Jul. 23, 1985

[54] ADJUSTABLE VALVE FOR FAUCET OR SHOWER HEAD

[76] Inventor: Humberto E. Bueno, P.O. Box 4186, South Daytona, Fla. 32021

[21] Appl. No.: 465,684

[22] Filed: Feb. 9, 1983

[51] Int. Cl.³ .................... B05B 7/12; B05B 1/16
[52] U.S. Cl. ........................ 239/407; 239/417.3; 239/428.5; 239/569; 137/625.31; 251/352
[58] Field of Search ............... 137/625.31; 251/304, 251/352; 239/407, 417.3, 417.5, 428.5, 569

[56] References Cited

U.S. PATENT DOCUMENTS

| | | | |
|---|---|---|---|
| 2,950,063 | 8/1960 | Ripley | 239/407 |
| 3,214,069 | 10/1965 | Dike | 251/352 X |
| 4,145,004 | 3/1979 | Krizik | 239/579 |
| 4,221,338 | 9/1980 | Shames et al. | 239/428.5 |

*Primary Examiner*—Andres Kashnikow
*Assistant Examiner*—James R. Moon, Jr.
*Attorney, Agent, or Firm*—Harvey B. Jacobson

[57] ABSTRACT

An adjustable valve incorporated into a faucet or shower head which is manually manipulatable in order to control water flow at the faucet or shower head with the adjustable valve including interchangeable components to enable the faucet and shower head to be provided with an aerator or jet spray arrangement and enabling the components to be assembled in a manner which will reduce the number of different components necessary to assemble either a faucet or shower head which includes an adjustable valve therein. The adjustable valve includes a rotatably supported crown or shower head bell which can be manually rotated to adjust the valve with the valve itself including a restrictor having orifices therein and a valve plate having flat surfaces and a cavity associated with a central opening to enable control of flow through the orifices. In addition, the adjustable valve includes components enabling transfer of rotational movement from the crown or shower head bell to the valve plate and components enabling discharge of aerated water or discharge of jet spray water. The assembly includes an external head or housing which may be screw threaded internally at the upper end thereof or externally at the upper end thereof for association with a faucet or shower pipe provided with external or internal threads. Interchangeable sprinkler and jet spray assemblies are positionable in the housing with the restrictor and valve plate being identical in both the faucet and shower head assembly. Also, the crown and shower head bell are interchangeable thereby reducing the number of components which must be manufactured in order to provide a faucet with either an aerating discharge or jet spray discharge and a shower head with either an aerating or jet spray discharge.

17 Claims, 4 Drawing Figures

U.S. Patent  Jul. 23, 1985  Sheet 1 of 2  4,530,467
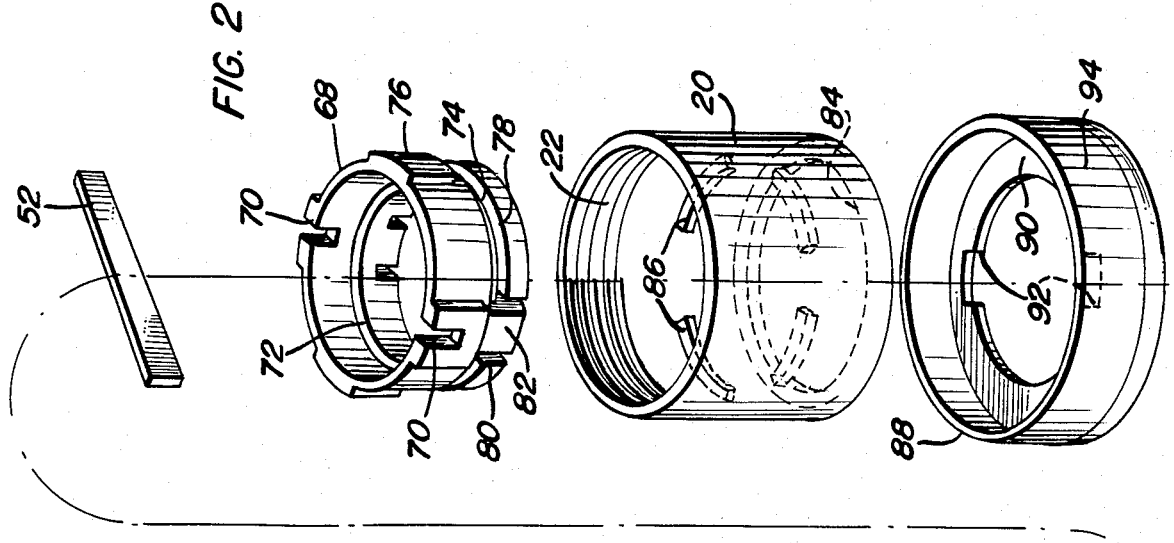
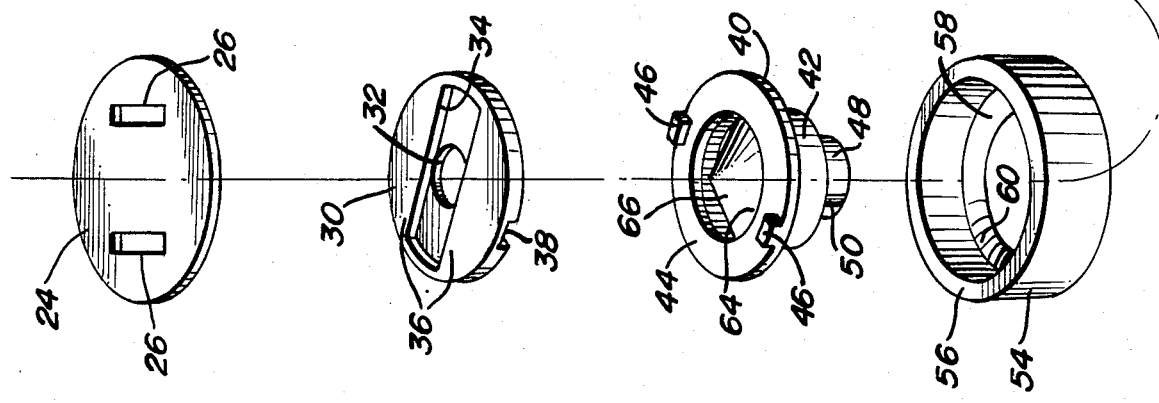
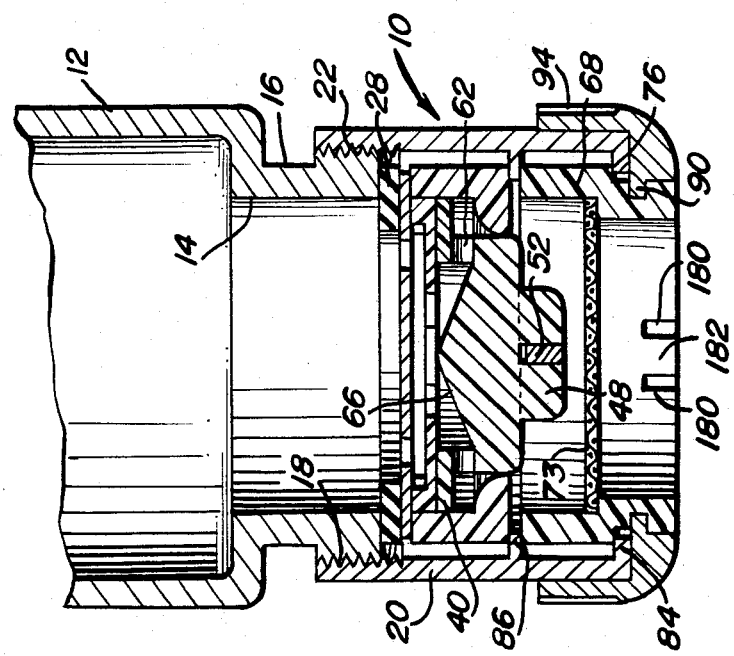

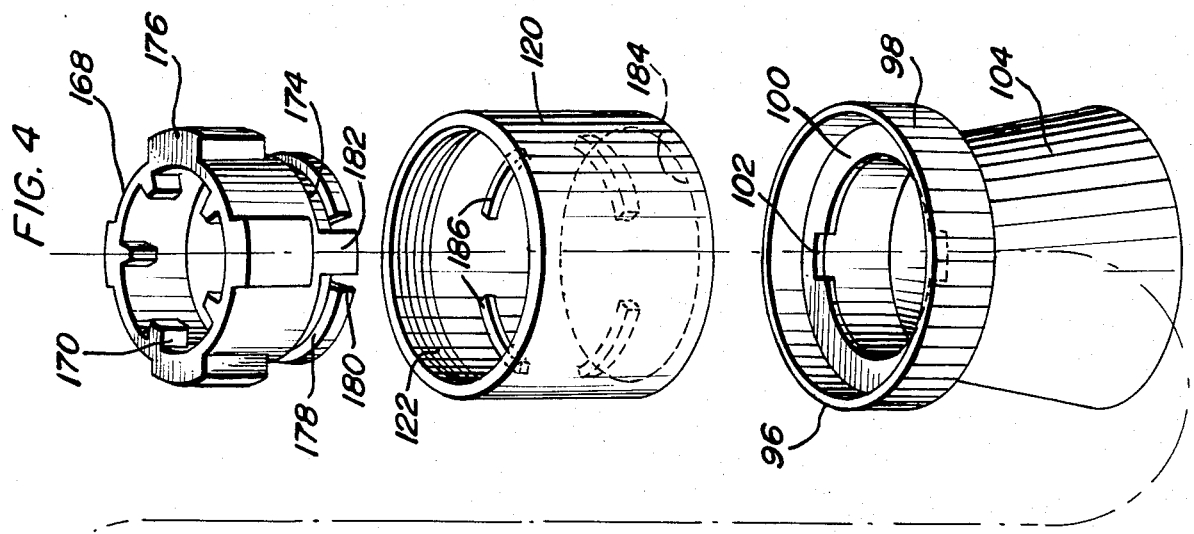
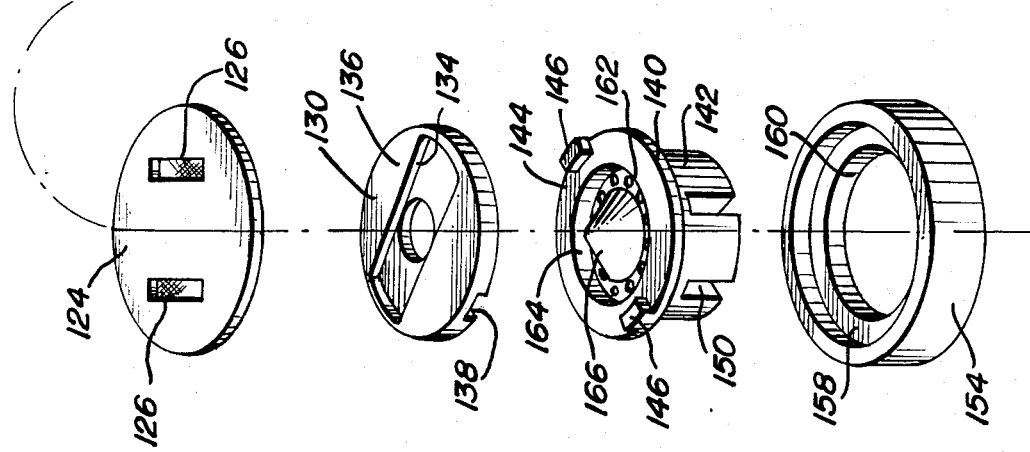

4,530,467

ADJUSTABLE VALVE FOR FAUCET OR SHOWER HEAD

BACKGROUND OF THE INVENTION

1. Field of the Invention

The present invention generally relates to a faucet and shower head and more particularly an adjustable valve assembly incorporated into the faucet or shower head by which water flow control can be obtained by a person manually manipulating the valve structure from the faucet head or shower head. The faucet and shower head have several identical components and other components which are interchangeable in a housing to provide a unique and efficient valve structure combined with an aerating assembly or a jet spray assembly to form a faucet or shower head either of which may have an aerated water discharge or jet spray discharge.

2. Description of Prior Art

Various developments have been provided in the construction of faucets, shower heads and the like. Such developments include aerating devices associated with faucets, shower heads and the like and spray control means incorporated into shower heads and the like. The following U.S. patents are those known to applicant relating to this field of endeavor.

| | | |
|---|---|---|
| 1,241,765 | Pritchett | 10/2/17 |
| 2,096,912 | Morris | 10/26/37 |
| 2,756,108 | Warren | 7/24/56 |
| 2,950,063 | Ripley, Jr. | 8/23/60 |
| 3,902,671 | Symmons | 9/2/75 |
| 4,145,004 | Krizik | 3/20/79 |
| 4,221,338 | Shames et al | 9/9/80 |

U.S. Pat. No. 1,241,765 discloses a shower head with a valve of a type different from the present invention incorporated therein. U.S. Pat. No. 2,096,912 discloses a shower head with a structure controlling the volume of flow therethrough. U.S. Pat. No. 2,756,108 discloses a shower head with a flow control incorporated therein. U.S. Pat. No. 2,950,063 discloses an aerating shower head with a variable spray device incorporated therein. U.S. Pat. No. 3,902,671 discloses an aerating shower head with a valve to direct flow through either an aerating discharge or spray discharge. U.S. Pat. No. 4,145,004 discloses a shower head having a rotatable member for controlling the position of a disc with orifices therein. U.S. Pat. No. 4,221,338 discloses a spray and aerator with a selector valve included.

None of the above mentioned patents discloses structural components oriented in a manner similar to the above invention and none of the above patents discloses structural components capable of functioning in the manner of this invention.

SUMMARY OF THE INVENTION

An object of the present invention is to provide an adjustable valve for a faucet and shower head which includes a readily accessible, manually manipulatable control element to enable the water control to be at the point of discharge of the water which effectively saves water, maintains initial temperature of the mixture of hot and cold water, avoids soap and dirty water from being deposited on the control valve handles for the faucet or shower head, retained within the size parameters of conventional faucets and shower heads, constructed of very few parts, assembled without external fastening devices, easy to clean and repair, provided with interchangeable components which are simply assembled to enable a faucet with aerated water discharge or jet spray discharge to be assembled and to enable a shower head with aerated water discharge or jet spray water discharge to be assembled.

Another object of the invention is to provide an adjustable valve in accordance with the preceding object which includes a restrictor in the form of a disc or plate having a substantially flat bottom surface cooperating with a substantially flat surface of a rotatable valve plate having a cavity in the upper surface thereof for selective registry with the orifices in the restrictor for controlling flow through the faucet or shower head.

A further object of the invention is to provide an adjustable valve for a faucet or shower head as set forth in the preceding objects in which the components are oriented within a housing which may be either externally screw threaded or internally screw threaded at its upper end for screw threaded engagement with an internally or externally threaded faucet pipe or shower pipe with the faucet assembly including a crown portion rotatably journalled on the housing and having an operative connection with the valve plate or a shower head rotatably connected to the housing and having an operative connection with the valve plate.

Still another object of the invention is to provide an adjustable valve in accordance with the preceding objects in which the operative connecting structure between the rotatable component and the valve plate includes interchangeable components to provide an aerated water discharge or a jet spray water discharge thereby enabling a minimum of components to be manufactured so that by selective and interchangeable assembly, a faucet or shower head may be assembled with either assembly being capable of aeration or jet spray discharge.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a sectional view of the faucet having the adjustable valve incorporated therein and assembled for providing an aerated water discharge.

FIG. 2 is an exploded group perspective view illustrating the components of the faucet and adjustable valve illustrated in FIG. 1.

FIG. 3 is a sectional view of a shower head assembly with an adjustable valve and components providing a jet spray discharge.

FIG. 4 is an exploded group perspective view of the components of the structure of FIG. 3.

DESCRIPTION OF THE PREFERRED EMBODIMENTS

Referring now specifically to FIGS. 1 and 2 of the drawings, a faucet incorporating the adjustable valve of the present invention is generally designated by reference numeral 10 and is attached to a supply pipe 12 which may be in the form of a conventional faucet structure associated with a lavatory in which hot and cold water are mixed in a single pipe 12 and discharged through a passageway 14 in a nipple 16 integral with the pipe 12 and provided with external threads 18. It is pointed out that in some instances, the nipple 16 may be the same size as the pipe 12 and may be provided with internal threads with the faucet 10 being adapted to be threadedly engaged with the external threads 18 or internal threads (not shown) if provided.

The faucet 10 includes a generally cylindrical housing 20 provided with internal threads 22 at the upper end thereof for threaded engagement with the external threads 18. By providing the housing 20 with external threads, the faucet 10 can be just as readily attached to an internally threaded nipple or pipe.

Internally of the housing 20, an adjustable valve is provided which includes a circular plate in the form of a restrictor 24 which has a pair of orifices 26 therein with the orifices being rectangular in configuration and parallel to each other and spaced equally and symmetrically from the center of the restrictor 24 as illustrated in FIG. 2 with the restrictor 24 being relatively thin and provided with planar upper and lower surfaces. The restrictor 24 is engaged with a sealing washer 28 in the form of an annular rubber or plastic washer which abuts against the end of the nipple 16 and against the upper surface of the restrictor 24 outwardly of the orifices 26. Underlying the restrictor 24 is a valve plate 30 in the form of a thin disc having a centrally disposed opening 32 therethrough with the valve plate 30 having substantially planar top and bottom surfaces. The top surface of the plate 30 is provided with a cavity 34 which is generally rectangular in configuration and includes the opening 32 in the center thereof with the width of the cavity 34 being substantially the same as the diameter of the opening 32 with the length of the cavity 34 extending almost to the peripheral edge of the valve plate 30. The top surface of the valve plate 30 on both sides of the cavity 34 has a flat surface 36 which engages the undersurface of the restrictor 24. The dimensions of the cavity 34 is such that when the cavity 34 is aligned with the orifices 26, water flow is permitted through the orifices 26 in the restrictor 24, into the cavity 34 and through the opening 32. By rotating the valve plate 30, the surfaces 36 may block off the orifices 26 to any degree desired or completely when the cavity 34 is misaligned with the orifices 26. However, when the restrictor orifices are fully closed, some water will intentionally leak through the valve structure so that the original mixture of water to obtain a desired temperature will be maintained. Also as illustrated in FIG. 1, the diameter of the restrictor 24 is larger than the diameter of the valve plate 30 so that the restrictor can be securely locked in non-rotative relation to the nipple 16 in a manner defined hereinafter while the valve plate 30 can be rotated in a manner set forth hereinafter.

In order to rotate the valve plate 30, the bottom surface thereof is provided with a pair of notches 38 which extend diametrically of the plate 30. Underlying the valve plate 30 is a sprinkler adapter 40 which includes a cylindrical body 42 having an outwardly extending flange 44 at its upper end with the flange 44 including a pair of upwardly projecting lugs 46 thereon adapted to be received in the notches 38 so that the sprinkler adapter 40 is drivingly connected to the valve plate 30 with the diameter of the flange 44 being substantially the same as the diameter of the valve plate 30. The bottom center of the body 42 is provided with a projection of cylindrical configuration designated by numeral 48 which is smaller in diamter than the body 42 and includes a tranversely extending notch 50 communicating with the bottom end thereof for receiving a transverse bar or link 52. Disposed in encircling relation to the sprinkler adapter 40 and the valve plate 30 is a cylindrical ring 54 which has an upper edge 56 engaged with the bottom surface of the restrictor 24 to secure it in position against the sealing washer 28 as illustrated in FIG. 1 with the valve plate 30 and flange 44 being received within the interior of the ring 54 which has an inwardly extending flange 58 around the bottom periphery thereof which is provided with a tapering or rounded inner corner 60 at the upper edge thereof to enable passage of water between the inner edge of the flange 58 and the outer surface of the body 42. As illustrated in FIG. 1, the body 42 is provided with a plurality of radial passageways 62 immediately under the flange 44 which communicates the exterior of the body 42 with the hollow interior 64 which has a diameter larger than the opening 32 in the valve plate 30. Also, the body 42 includes a generally shallow conical upper surface 66 so that water flowing through the opening 32 will be directed along an inclined surface toward the passageways 62.

Positioned in underlying and non-engaging relation to ring 54 is a cylindrical sleeve 68 having a pair of diametrically opposed notches 70 in the upper surface thereof which receives the end portions of the bar or link 52 when assembled with the central part of the bar or link 52 being engaged in the notch 50 in the body 42. The inner surface of the sleeve 68 is provided with a shoulder 72 receiving a non-corrosive screen 73 of wire or similar material. The external surface of the sleeve 68 includes a downwardly facing shoulder 74 formed by a larger diameter upper portion and a smaller diameter lower portion with the upper portion of the sleeve including a plurality of radial lugs 76 with one pair of the lugs 76 including the notches 70 therein. The lower, reduced diameter end portion of the sleeve 68 is provided with a peripheral groove 78 and two pairs of diametrically opposed notches 80 extend from the groove 78 downwardly with the portion of the wall of the sleeve between the notches 80 being smooth on the external surface thereof so that, in effect, the groove 78 does not extend completely around the periphery of the sleeve but only around those portions externally of the notches 80 so that between the notches 80, a key or lug 82 is formed for a purpose described hereinafter.

The housing 20 encloses all of the aforementioned components and includes a lower flange or seat 84 on which the lugs 76 rest and a central flange or seat 86 on which the ring 54 rests. The housing 20 is non-rotatively connected to the pipe 12 after assembly and the ring 54, restrictor 24 and rubber sealing washer 28 are fixedly secured to the nipple 16 when the housing 20 is tightly screw threaded onto the external threads 18. This enables the sleeve 68, link 52, sprinkler adapter 40 and valve plate 30 to be rotated by turning a generally cylindrical or annular crown 88 telescoping over the lower portion of the housing 20 and including an internal flange 90 having a pair of notches 92 formed diametrically therein with the flange being snap-fittingly engaged with and mounted in the groove 78 in the sleeve 68 as illustrated in FIG. 1 with the keys or lugs 82 engaged in the notches 92 so that rotation of the crown 88 will cause rotation of the sleeve 68 and corresponding rotation of the sprinkler adapter 40 and valve plate 30. The projections or lugs 76 on the exterior of the sleeve 68 provide for flow of air from the lower rim to the top of the sleeve 68 through the space left between the housing 20 and the portion of the upper end of the sleeve 68 which has the lugs 76 thereon and this air will mix with the water before flowing through the screen inasmuch as the flange or seat 86 is interrupted which also enables the sleeve 68 to be inserted downwardly into the housing so that the lugs 76 can rest on the lower flange or seat 84. The exterior of the crown is provided with vertical serrations 94 or the like to facilitate gripping engagement with the crown 88 to enable it to be easily rotated.

The external components including the housing 20 and crown 88 are preferably chrome plated brass whereas the internal components such as the sleeve 68, ring 54, sprinkler adapter 40 and valve plate 30 may be plastic material although other materials may be used if desired and the restrictor 24 is preferably brass although other materials may be used. Also, the link 52 may be metal or plastic material and the screen 74 may be stainless steel or the like so that all of the components are non-corrosive, long lasting and easily assembled and disassembled. The sleeve 68 may be dropped into the upper end of the housing 20 with the lugs 76 passing through the interrupted portions of the upper flange 86 and coming to rest on the lower flange 84 with the crown flange 90 then being snapped into the groove 78 thus securing these components rotatably to the housing 20. Thereafter, the link 52, ring 54, sprinkler adapter 40, valve plate 30, restrictor 24 and washer 28 may be assembled into the housing 20 and the housing 20 screwed onto the supply pipe 12. With the device assembled, the flow of water through the faucet 10 may be accurately and conveniently controlled by rotating the crown 88 thereby eliminating the necessity of grasping valve handles when it is desired to vary the flow of water from the faucet.

As previously indicated, the faucet 10 produces an aerated water discharge. In order to convert the structure to a shower head having an aerated water discharge, the crown 88 is interchanged with a shower head bell 96 illustrated in FIGS. 3 and 4 which includes a cylindrical portion the same as the cylindrical portion of the crown 88 with vertical grooves or recesses forming a gripping area 98 and an internal flange 100 having notches 102 therein so that the crown 88 may be removed from the faucet 10 in FIG. 1 and replaced by using the shower head bell 96 which includes a depending outwardly diverging wall 104 to guide the discharge of water from the shower head. The configuration of the shower head may be varied but the manner of connecting the shower head bell 96 to the sleeve 68 would be exactly the same manner as connecting the crown 88 thereto so that by interchanging the crown 88 and the shower head bell 96, the faucet 10 may be converted from a faucet having aerated water discharge to a shower head having aerated water discharge.

Referring now specifically to FIGS. 3 and 4, a shower head is generally designated by numeral 110 which includes a supply pipe 112 that is externally threaded. In this construction, rather than having an aerated water discharge, a jet spray water discharge will be provided. However, some of the structural components employed in the faucet 10 in FIGS. 1 and 2 are also employed in the shower head 110 including the restrictor 124 having orifices 126 therein which is identical to the restrictor 24 in FIGS. 1 and 2. Also, the valve plate 130 is identical to the valve plate 30 in FIGS. 1 and 2. Additionally, the housing 120 is identical to the housing 20 in FIGS. 1 and 2. Also, the ring 154 is substantially identical to the ring 54 in FIG. 1 except that the tapered inner edge is not used on the flange 158 thus providing an inner cylindrical surface 160 on the flange 158.

Rather than a sprinkler adapter as illustrated in FIGS. 1 and 2, a jet spray adapter 140 is positioned below the valve plate 130 and includes a cylindrical body 142 having an outwardly extending flange 144 at the upper end thereof and upwardly projecting lugs 146 thereon which are received in the notches 138 in the valve plate 130. The lower end of the cylindrical body 142 is provided with a plurality of notches or grooves 150 and the hollow interior at the upper end of the jet spray adapter 140 as designated by numeral 164 is provided with a conical deflector 166 and a plurality of vertical passageways 162 therein which communicates the hollow interior 164 with the lower end of the jet spray adapter 140. The flange 158 on the ring 154 closely surrounds the cylindrical body 142 but the cylindrical body 142 can rotate in relation to the ring 154 and the components are assembled in the same manner as in FIGS. 1 and 2.

A sleeve 168 of cylindrical construction is disposed below the adapter 140 and includes a plurality of inwardly extending sprockets or lugs 170 on the upper inner surface thereof for interlocking engagement with the notches 150. The outer surface of the sleeve 168 is provided with a shoulder 174 which faces downwardly and a plurality of lugs 176 are provided on the external surface of the upper portion of the sleeve 168. A peripheral groove 178 extends around the periphery of the lower portion of the sleeve 168 and a pair of notches 180 extend from the ends of the groove 178 downwardly to the lower end of the sleeve 168 thus leaving lugs or keys 182 extending upwardly from the bottom edge of the sleeve 168 which are continuous with the external surface of the lower portion of the sleeve 168. The housing 120 includes a lower flange 184 and an intermediate flange 186 which is interrupted and is identical to the housing 20 in FIGS. 1 and 2 with the lower flange 184 supporting the lugs 176; the lugs 176 aligned with the interruptions in the flange 186 enable the sleeve 168 to be positioned downwardly in the housing 120 with the flange 100 being snap-fittedly engaged in the groove 178 and the lugs or keys 182 being received in the notches 102 in the flange 100 thereby rotatably locking the shower head bell 96 to the sleeve 168 so that rotation of the shower head bell 96 will rotate the sleeve 168 and the engagement between the sprockets or lugs 170 and the notches 150 will rotate the jet spray adapter 140 and the engagement between the lugs 146 and the notches 138 will rotate the valve plate 130 thereby enabling manual manipulation and control of the shower head 110. In view of the difference in the construction of the jet spray adapter 140 as compared to the sprinkler adapter 40, the discharge will be in the form of a jet spray.

As indicated in connection with the faucet in FIG. 1, the shower head bell 96 can be easily removed and the crown 88 substituted therefor thereby providing a faucet having a jet spray discharge. Thus, the present invention provides a faucet with either an aerated water discharge or a jet spray water discharge or a shower head with an aerated water discharge or jet spray water discharge. In addition, the components that are not identical are interchangeable with each other. As indicated, the components 24 and 124, 30 and 130, 20 and 120 are identical and the ring 154 is almost identical to the ring 54 and is interchangeable therewith along with the adapter 140 being interchangeable with the adapter 40 and the sleeve 168 being interchanged with the sleeve 68. With this arrangement, a minimum of differently constructed components may be inventoried and still enable assembly of a desired type of faucet or shower head.

In operation, the valve may be rotated to fully open the orifices in the restrictor, fully close the orifices in the restrictor or partially open or close the orifices in the restrictor. When the restrictor orifices are fully opened, free water flow occurs. When the restrictor orifices are fully closed, some water will intentionally leak so that the original mixture temperature of the hot and cold water passing through the faucet will be maintained. This arrangement provides for minimum of water flow at the time when a user is soaping his hands or body. When the restrictor orifices are partially opened or closed, the volume of flow may be controlled to any desired rate. The crown 88 of the faucet or the shower head bell 96 are connected to one or the other of the sleeves 68 or 168 by snapping their flange into the corresponding groove of the sleeve so that the crown or bell will rotate with the sleeve and the crown, sleeve and housing or the bell, sleeve and housing will be in assembled relationship. In the aerator mode, the rotation of the sleeve is transmitted to the sprinkler adapter through the link bar 52 and rotation of the sprinkler adapter 40 is transmitted to the valve plate 30 by the lugs and notches 46 and 38. In the jet spray mode, rotation of the crown or bell and sleeve will be transmitted to the jet spray adapter 140 through the lugs or sprockets 170 on the sleeve 168 engaged with the notches or grooves 150 in the jet spray adapter 140 and rotation of the valve plate 130 is accomplished by the lugs 146 engaging the notches 138. The external configuration of the sleeve 168 is identical to the sleeve 68 and is interchangeable therewith. The lugs 176 which provide air passageways is useful in the jet spray mode since some air will flow from the lower rim to the top which air supply will soften to some degree the force of the water jets discharge from the jet spray adapter 140. The sprinkler adapter 40 with the radial passageways 62 and the conical surface 66 is contructed so that it divides the main stream of water in small horizontal jets of water which impinge on the surface of the ring 54 to change the water direction toward the lower end of body 42 to create a favorable condition for mixing the water with air.

The components of the present invention are constructed so that standard faucet sizes are maintained with the small number of parts; rendering the device simple to assemble and easy to clean and repair without the necessity of removing screws or similar fastener devices. The adjustable valve will save considerable water when soaping the hands or body since substantial water is usually wasted during this procedure. Also, the valve holds the initial temperature of the mixture of hot and cold water. Both the shower head and faucet have a readily accessible flow control since it is located at the tip of the faucet and the shower head. Also, the use of this valve eliminates the main valve handles becoming stained or soiled due to soap and water coming into contact therewith during normal manipulation of such valves when the main valves are used to control the water flow.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An adjustable valve for a faucet or shower head comprising a housing with means fixedly but detachably connecting the housing to a pipe having a supply of water communicated therewith, a valve assembly positioned in said housing, said valve assembly including a stationary member and a movable member for opening and closing passageway defining means, an actuator disposed at the tip of the faucet or shower head to enable manual manipulation of the movable member forming part of the valve assembly and means interconnecting the actuator and the movable member of the valve assembly for actuating the valve assembly from the tip of the faucet or shower head, said stationary member being a restrictor having eccentric orifice means therein, said movable member being a rotatable valve plate disposed against the restrictor and including passageway defining means therein for selective registry with the orifice means in the restriction, said passageway defining means in the plate including an opening spaced radially from the orifice means in the restrictor and a radially extending passageway in the plate communicating with said opening and being selectively registrable with said eccentric orifice means during rotational movement of the valve plate.

2. The structure as defined in claim 1 wherein said orifice means in the restrictor includes an opening extending therethrough in offset relation to the center thereof, said valve plate opening being centrally disposed and said radially extending passageway including a cavity in the top surface of the valve plate, said top surface of the valve plate including flat surfaces engaged with the restrictor to vary communication between the orifice means in the restrictor and the passageway defining means in the valve plate.

3. The structure as defined in claim 2 wherein said actuator is a crown in the form of an annular member rotatably associated with the end of the housing.

4. The structure as defined in claim 3 wherein said means interconnecting the crown and the valve assembly includes a sleeve having one end fixedly but detachably connected to the crown for rotation therewith, and an adapter interconnecting the sleeve and valve plate for rotating the valve plate in response to rotation of the crown.

5. The structure as defined in claim 4 wherein said adapter includes a cylindrical body with lug and notch means interconnecting the cylindrical body and the valve plate, said adapter including passageway defining means to enable water to pass therethrough and means connecting the end of the adapter remote from the valve plate with the sleeve.

6. An adjustable valve for a faucet or shower head comprising a housing with means fixedly but detachably connecting the housing to a pipe having a supply of water communicated therewith, a valve assembly positioned in said housing, said valve assembly including a stationary member and a movable member for opening and closing passageway defining means, an actuator disposed at the tip of the faucet or shower head to enable manual manipulation of the movable member forming part of the valve assembly and means interconnecting the actuator and the movable member of the valve assembly for actuating the valve from the tip of the faucet or shower head, said stationary member being a restrictor having orifice means therein, said movable member being a rotatable valve plate disposed against the restrictor and including passageway defining means therein for selective registry with the orifice means in the restrictor, said orifice means in the restrictor including an opening extending therethrough in offset relation to the center thereof, said valve plate including a central opening and a cavity in the top surface forming said passageway defining means therethrough with the top surface of the valve plate including flat surfaces engaged with the restrictor to vary communication between the orifice means in the restrictor and the passageway defining means in the valve plate, said actuator being a crown in the form of an annular member rotatably associated with the end of the housing, said means interconnecting the crown and the valve assembly including a sleeve having one end fixedly but detachably connected to the crown for rotation therewith, and an adapter interconnecting the sleeve and valve plate for rotating the valve plate in response to rotation of the crown, said adapter including a cylindrical body with lug and notch means interconnecting the cylindrical body and the valve plate, said adapter including passageway defining means to enable water to pass therethrough and means connecting the end of the adapter remote from the valve plate with the sleeve, said means connecting the adapter with the sleeve including a transverse notch in the lower end of the adapter, a transverse notch in the upper end of the sleeve and a transverse bar received in said notches for transmitting rotational movement from the sleeve to the adapter.

7. The structure as defined in claim 5 wherein said means connecting the adapter to the sleeve includes a plurality of notches in the lower end of the cylindrical body with the cylindrical body being telescoped into the upper end of the sleeve, said sleeve including a plurality of lugs projecting radially inwardly in the upper end thereof for telescopic driving engagement with the notches in the lower end of the cylindrical body thereby transferring rotational movement of the sleeve to the adapter.

8. An adjustable valve for a faucet or shower head comprising a housing with means fixedly but detachably connecting the housing to a pipe having a supply of water communicated therewith, a valve assembly positioned in said housing, said valve assembly including a stationary member and a movable member for opening and closing passageway defining means, an actuator disposed at the tip of the faucet or shower head to enable manual manipulation of the movable member forming part of the valve assembly and means interconnecting the actuator and the movable member of the valve assembly for actuating the valve from the tip of the faucet or shower head, said stationary member being a restrictor having orifice means therein, said movable member being a rotatable valve plate disposed against the restrictor and including passageway defining means therein for selective registry with the orifice means in the restrictor, said orifice means in the restrictor including an opening extending therethrough in off set relation to the center thereof, said valve plate including a central opening and a cavity in the top surface forming said passageway defining means therethrough with the top surface of the valve plate including flat surfaces engaged with the restrictor to vary communication between the orifice means in the restrictor and the passageway defining means in the valve plate, said actuator being a crown in the form of an annular member rotatably associated with the end of the housing, said means interconnecting the crown and the valve assembly including a sleeve having one end fixedly but detachably connected to the crown for rotation therewith, and an adapter interconnecting the sleeve and valve plate for rotating the valve plate in response to rotation of the crown, said adapter including a cylindrical body with lug and notch means interconnecting the cylindrical body and the valve plate, said adapter including passageway defining means to enable water to pass therethrough and means connecting the end of the adapter remote from the valve plate with the sleeve, said sleeve including an internal shoulder formed therein for receiving a screen mesh material, said adapter including lateral openings forming passageway defining means for water and means intermingling air and water as it passes through the adapter and sleeve for discharging aerated water.

9. The structure as defined in claim 5 wherein said adapter includes a plurality of longitudinal passageways forming said passageway defining means for passage of water therethrough to provide a jet spray water discharge.

10. The structure as defined in claim 2 wherein said actuator is in the form of a shower head readily accessible to a person taking a shower to enable control of flow of water at the discharge end of the shower head.

11. The structure as defined in claim 6 wherein said adapter includes lateral openings forming passageway defining means for water and means intermingling air and water passes through the adapter and sleeve for discharging aerated water.

12. The structure as defined in claim 2 wherein said means connecting the actuator and the valve assembly includes a sleeve having one end fixedly but detachably connected to the actuator for rotation therewith, and an adapter interconnecting the sleeve and valve plate for rotating the valve plate in response to rotation of the actuator, said adapter including a cylindrical body, lug and notch means interconnecting the cylindrical body and the valve plate with the adapter including passageway defining means to enable water to pass therethrough and means connecting the end of the adapter remote from the valve plate with the sleeve, said adapter and sleeve including disengagable interlocking means to enable vertical assembly of the adapter and sleeve.

13. The structure as defined in claim 12 wherein said passageway defining means in the adapter includes a plurality of lateral openings and means intermingling air and water as it passes through the lateral openings in the adapter and between the adapter and sleeve for discharging aerated water.

14. The structure as defined in claim 12 wherein said passageway defining means in the adapter includes a plurality of longitudinal passageways in the adapter to provide a jet spray water discharge.

15. The structure as defined in claim 12 wherein said actuator is a faucet crown rotatably connected to said housing and non-rotatably connected to said sleeve.

16. The structure as defined in claim 12 wherein said actuator is in the form of a shower head bell rotatably connected to the housing and non-rotatably connected to said sleeve.

17. The structure as defined in claim 1 wherein said orifice means in the restrictor includes a pair of openings extending therethrough in offset relation to the center thereof and in symmetrical relation to the center, said restrictor being in the form of a thin plate having substantially planar upper and lower surfaces with the lower planar surface of the restrictor cooperating with the valve plate, said valve plate opening being centrally disposed and including a central opening of a diameter less than the distance between the openings in the restrictor, said valve plate passageway including a cavity in the top surface for registry with the openings in the restrictor in the open position of the valve plate and out of registry with the openings in the restrictor in the closed position of the valve plate, said valve plate including a substantially flat top surface outwardly of the cavity with the flat top surface of the valve plate being in registry with the openings in the restrictor when the cavity is out of registry with the openings in the restrictor to close the passageway defining means thereby controlling flow to the faucet or shower head by rotating the valve plate in relation to the restrictor by manipulating the actuator at the tip of the faucet or shower head.

* * * * *